US012736440B2

(12) United States Patent
Mupende et al.

(10) Patent No.: US 12,736,440 B2
(45) Date of Patent: Sep. 15, 2026

(54) APPARATUS FOR DETERMINING DAMAGE ON STRUCTURAL COMPONENTS AND WORK MACHINE COMPRISING SUCH AN APPARATUS

(71) Applicant: Liebherr-Components Biberach GmbH, Biberach an der Riß (DE)

(72) Inventors: Yvon Ilaka Mupende, Neu-Ulm (DE); Johannes Weimer, Biberach (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 414 days.

(21) Appl. No.: 18/552,184

(22) PCT Filed: Apr. 7, 2022

(86) PCT No.: PCT/EP2022/059298
§ 371 (c)(1),
(2) Date: Sep. 24, 2023

(87) PCT Pub. No.: WO2022/214608
PCT Pub. Date: Oct. 13, 2022

(65) Prior Publication Data

US 2024/0167914 A1 May 23, 2024

(30) Foreign Application Priority Data

Apr. 8, 2021 (DE) ..................... 10 2021 108 748.1

(51) Int. Cl.
*G06F 11/30* (2006.01)
*G01M 13/045* (2019.01)
*G01N 29/44* (2006.01)

(52) U.S. Cl.
CPC ...... *G01M 13/045* (2013.01); *G01N 29/4436* (2013.01); *G01N 2291/0258* (2013.01)

(58) Field of Classification Search
CPC .................................................. G01M 13/045
See application file for complete search history.

(56) References Cited

U.S. PATENT DOCUMENTS 4,956,999 A 9/1990 Bohannan
6,351,713 B1 2/2002 Board et al.
(Continued)

FOREIGN PATENT DOCUMENTS

CN 112601711 A 4/2021
DE 102008051176 A1 4/2010
(Continued)

OTHER PUBLICATIONS

International Search Report and Written Opinion from Application No. PCT/EP2022/059298 dated Jul. 18, 2022.
(Continued)

*Primary Examiner* — Phuong Huynh
(74) *Attorney, Agent, or Firm* — Troutman Pepper Locke LLP; Ryan A. Schneider; Nicholas H. Doss

(57) ABSTRACT

An apparatus for determining damage on structural components, for example large rolling bearings, on work machines, in particular construction, material handling and/or conveying machines, including at least one structure-borne sound sensor for detecting structure-borne sound signals of at least one structural component of the work machine, and also an evaluation device for evaluating the detected structure-borne sound signals and determining the damage state on the basis of a comparison of the detected structure-borne sound signals with at least one structure-borne sound signal reference pattern, provision being made of a detection device for detecting state and/or environmental changes relevant to structure-borne sound, and also an adapting device for adapting the at least one structure-borne sound signal reference pattern and/or an evaluation criterion of the evalua- (Continued)

Figure 1:
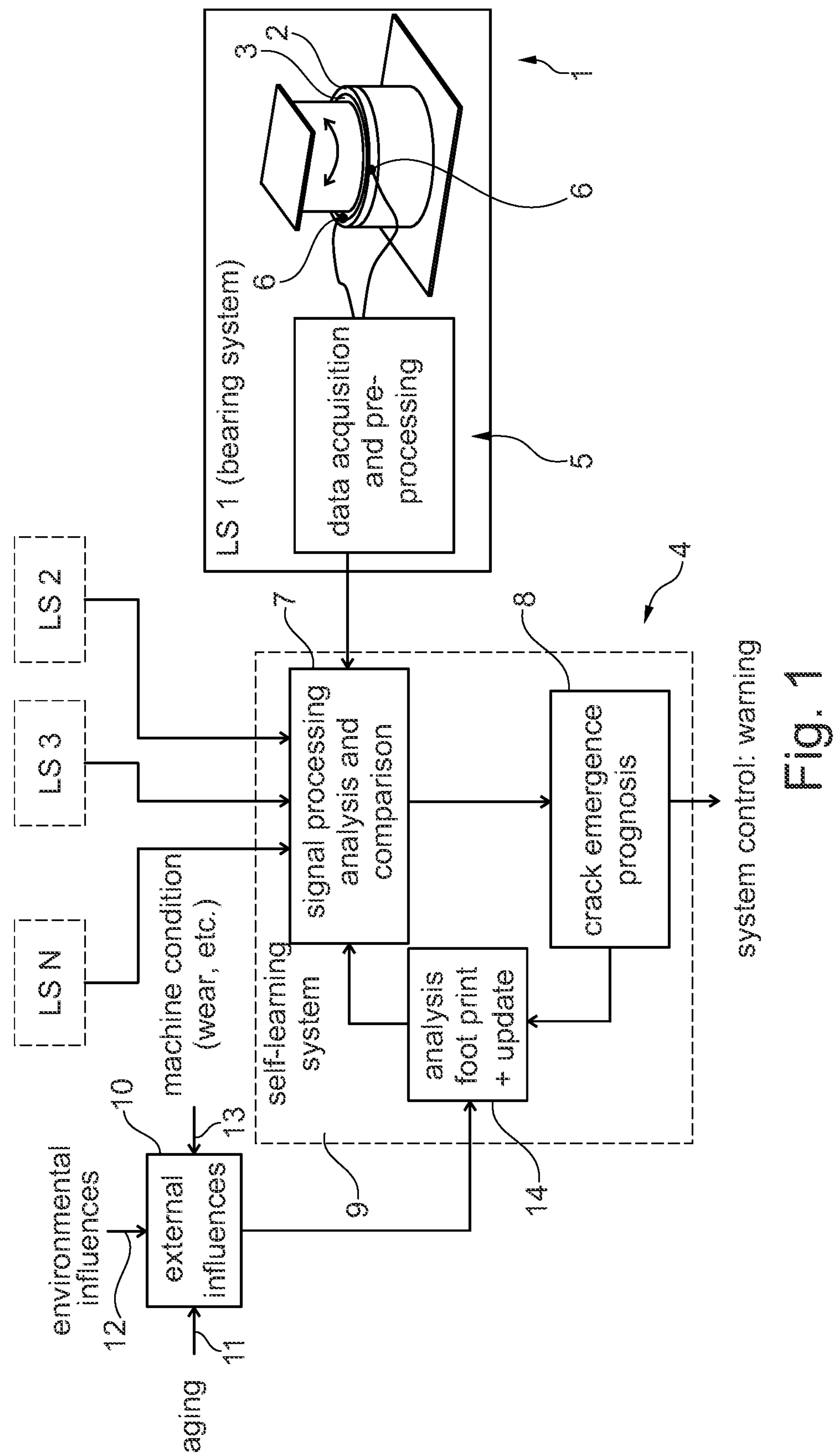

tion device on the basis of the detected state and/or environmental changes.

19 Claims, 9 Drawing Sheets

(56) References Cited

U.S. PATENT DOCUMENTS

| | | | |
|---|---|---|---|
| 11,391,704 | B2 | 7/2022 | Bittner et al. |
| 2003/0030565 | A1 | 2/2003 | Sakatani et al. |
| 2022/0252481 | A1 | 8/2022 | Jöhnßen et al. |

FOREIGN PATENT DOCUMENTS

| | | | | |
|---|---|---|---|---|
| DE | 102018210470 | A1 | 1/2020 | |
| DE | 102019219371 | A1 | 10/2020 | |
| EP | 2402731 | A1 * | 1/2012 | .......... G01M 13/045 |
| EP | 2544010 | A1 * | 1/2013 | ............. F16C 19/52 |
| EP | 2696071 | A1 | 2/2014 | |
| JP | H0618491 | A | 1/1994 | |
| WO | 2010085971 | A1 | 8/2010 | |
| WO | 2020259819 | A1 | 12/2020 | |

OTHER PUBLICATIONS

GPTO Search Report for Priority Application DE 10 2021 108 748 1 dated Mar. 10, 2022.

Office Action issued Apr. 30, 2026 for Chinese Application No. 202280026811.1 (8 pages).

* cited by examiner

APPARATUS FOR DETERMINING DAMAGE ON STRUCTURAL COMPONENTS AND WORK MACHINE COMPRISING SUCH AN APPARATUS

The present invention relates to an apparatus for determining damage on structural components, such as large rolling bearings, on work machines, such as construction, material handling and/or conveying machines, comprising at least one structure-borne sound sensor for detecting structure-borne sound signals of at least one structural component, and an evaluation device for evaluating the detected structure-borne sound signals and determining the damage state on the basis of a comparison of the detected structure-borne sound signals comprising at least one structure-borne sound reference pattern. The invention further relates to such a work machine comprising such an apparatus for determining damage on structural components of the work machine.

For construction machines such as excavators, cranes, dump trucks, dozers, bulldozers or rope excavators, or materials-handling machines or conveyor machines such as forklifts and loaders, or other larger work machines such as surface milling machines or ship cranes, it is equally important and difficult to predict the remaining service life or the remaining time before a structural part needs to be replaced. If a construction machine fails while in use at a construction site, for example because a bearing seizes or overheats, it is often not possible to immediately obtain a suitable replacement machine and deliver it to the construction site, causing delays on the construction site during the repair time required for the repair, while often not only the tasks of the failed construction machinery themselves remain undone, but other processes also encounter delays due to the interlinked operations of various construction machinery. A similar problem also arises with the material handling machines and conveyors.

These are often only individual components or structural components that are easy to replace per se and would not cause any major consequential delays if the replacement can be planned in good time, but on the other hand can also cause major repair expenses if other machine components are also affected when the small structural component breaks.

In this respect, it is normal for structural components to show a certain amount of wear as their service life progresses, without this immediately necessitating replacement of the component. As long as the function of the component is guaranteed and there is no threat of failure, such signs of wear, which are not dangerous for operation, are accepted in order to maximize the service life. Such minor, tolerable signs of wear can be, for example, small hairline cracks that are not critical for strength, or minor surface chipping or pitting of less functionally relevant surfaces. Such signs of wear can also be other component changes such as decreasing elasticity or increasing bearing clearance.

Depending on how the structural components of a work machine are monitored, it can be very difficult to differentiate between critical damage and non-critical damage, since the signal response of the component-monitoring sensor system in the case of even minor component changes can show changes of greater or lesser significance.

When monitoring structure-borne sound emissions from a machine structure using acoustic or structure-borne sound sensors, signal changes can result from a variety of component changes. For example, sound emissions may increase quantitatively or change in frequency band or pattern if, for example, bearing clearance increases due to normal wear and/or irregular running or jerky operation occurs due to contamination and resulting imbalances. While such signs of wear do not yet represent critical damage for operation, damage that endangers or shortens the remaining service life, such as cracks in the race of a large rolling bearing or larger pittings in the running surface of a rolling bearing, can lead to increased structure-borne noise emissions or a change in the frequency pattern of the structure-borne noise.

In this respect, it is difficult to draw conclusions about the actual damage state of the structural component from deviations of the actually detected structure-borne sound signals from one or more structure-borne sound reference patterns. In particular, fixed deviation or tolerance limits can lead to an excessive error rate and only a vague forecast of the remaining service life or the maintenance requirement.

It is therefore the underlying object of the present invention to create an improved apparatus as well as an improved work machine of the type mentioned above, which avoid the disadvantages of the prior art and further develop the latter in an advantageous manner. In particular, a permanently accurate prediction of the maintenance requirement or the remaining service life with a low error rate on the basis of the structure-borne noise of the work machine is to be made possible.

The task is solved, according to the invention, with an apparatus as claimed in claim 1 and a work machine as claimed in claim 16. Preferred embodiments of the invention are the subject of the dependent claims.

It is therefore proposed to continuously adapt the evaluation of the detected structure-borne sound signals and/or a structure-borne sound signal reference pattern used for the evaluation to changes in a machine and/or operating condition and/or an environmental influence that can affect the structure-borne sound emissions of the work machine, in order to be able to make more accurate predictions with a lower error rate. According to the invention, a detection device for detecting structure-borne sound signal relevant to machine and/or operating state and/or environmental changes as well as an adapting device for adapting the at least one structure-borne sound signal reference pattern and/or at least one evaluation criterion of the evaluation device on the basis of the detected state and/or environmental changes are provided. By updating the reference pattern and/or the evaluation criteria of the evaluation device on the basis of resulting state and/or environmental changes, abnormal structure-borne sound emissions can be more precisely identified and more accurately distinguished from noncritical changes in structure-borne sound, and thus a more accurate determination of damage can be achieved.

Advantageously, several machine and/or operating condition and/or environmental parameters can be detected and taken into account for adapting the structure-borne sound signal evaluation, wherein different parameters can be weighted differently and/or taken into account in different ways. Advantageously, at least two changes of state and/or environmental influence relevant to structure-borne sound are taken into account in interaction for adapting the structure-borne sound evaluation.

In this respect, a change in a respective parameter can be taken into account in absolute terms, e.g., in such a way that the evaluation is adapted when a predetermined amount of change is exceeded. Alternatively, or additionally, however, consideration can also be taken into account on a summarized basis, for example in such a way that an adjustment is made if a predetermined change is exceeded when the parameters are taken into account on a summarized basis.

In further development of the invention, various parameters can be taken into account. In particular, an age detection means can first detect the age and/or the operating hours or the operating duration of the work machine and/or of a predetermined structural component, the age detection means comprising, for example, an operating hours counter and/or also comprising an input device by means of which the age or the operating time can be entered cyclically by a machine user.

Depending on the detected age or operating hours, the adapting device can adapt at least one evaluation criterion of the evaluation device and/or the structure-borne sound signal reference pattern. For example, a tolerance threshold for permissible deviations from the reference pattern can be increased with increasing component age, or the signal level of the reference pattern itself can be increased, since structure-borne sound emissions usually increase with increasing age. Alternatively, or additionally, the reference pattern can also be changed with regard to its frequency band and/or course depending on age, for example if the structure-borne sound experiences a frequency shift due to increasing bearing clearance.

Alternatively, or in addition to such age detection means, however, the detection device may also include environmental influence detection means for detecting environmental influences on the work machine. Such environmental influence detection means may include, for example, a temperature sensor for detecting ambient temperature and/or a dirt sensor for detecting dirt, dust, or other particles in the ambient air. Alternatively, or additionally, the environmental influence detection means may include a humidity sensor and/or a salt content sensor and/or a UV light sensor. Such environmental influences as dust and particles in the air, which can adhere to bearing surfaces or gear meshing surfaces, for example, or increased salt content, which can lead to premature corrosion, or increased temperatures, which can lead to component expansion and reduced bearing clearance, for example, have an influence on the characteristic structure-borne noise emission pattern of the work machine and can change the latter even without component damage. In order to nevertheless reliably determine damage-relevant deviations of the structure-borne sound signals from the normal structure-borne sound emission pattern, the adapting device can adapt the evaluation criteria and/or the structure-borne sound signal reference pattern according to the detected environmental changes.

Alternatively, or in addition to detecting the environmental influences, the detection device can also detect at least one machine and/or operating state parameter of the work machine and have corresponding state detection means for this purpose. For example, the detection device may include set-up condition sensing and/or input means to detect a determined set-up condition or changes in the set-up condition of the work machine. For example, the amount of ballast can be detected in a hoist, or the lubricant supply can be detected in a moveably mounted structural part, in order to be able to estimate changes in structure-borne sound caused by, for example, a higher ballast load or a reduced lubricant supply, and to adapt the evaluation criteria or the reference pattern of the evaluation device accordingly.

However, the machine and/or operating condition detection means can also detect other parameters such as a parameter relevant to wear, such as the bearing clearance of a rolling bearing, or detect load variables that vary during operation, such as the lifting load of a crane and/or the tilting moment acting on the crane and thus, for example, a slewing gear large bearing. Depending on the operating load under which the work machine is operated, at least one evaluation criterion and/or the structure-borne sound signal reference pattern can be adapted by the adapting device to enable reliable identification of damage-relevant structure-borne sound signals.

In further development of the invention, the structure-borne sound signal evaluation is adapted to changing environmental and/or operating conditions or aging influences not on the basis of rigid criteria, but with the aid of a self-improving, variable control set. In particular, in further development of the invention, the evaluation device and adapting device are configured as a self-learning system, or the components configure part of a self-learning system that can estimate the influence of the detected state and/or environmental changes on the structure-borne sound and/or on the evaluation of the structure-borne sound signals.

In particular, the evaluation device and the adapting device may be configured with artificial intelligence or implemented in an AI system that may, for example, include a regression analysis module to estimate a relationship between the detected state and/or environmental changes and the structure-borne sound signals or the characteristic structure-borne sound signal reference pattern of the work machine or structural component. For example, the regression analysis module can adapt or further form a functional correlation between the parameters or a curve characterizing the dependence of the structure-borne sound emissions on the state and/or environmental parameters, preferably using the continuously detected state and/or environmental changes and the structure-borne sound signals that occur, in particular with the further aid of a training set of the parameters. The training set of parameters can be originally given, e.g., obtained on the basis of one or more test runs, and/or continuously updated or extended, in particular on the basis of data obtained during machine operation.

Advantageously, the system can be configured to determine, in the new state of the structural component, the oscillatory behavior and/or the oscillatory response of the structural component in operation and/or to predetermined loads, wherein the system can comprise a new state determination module for this purpose, which can determine the oscillatory behavior and/or the oscillatory response of the structural component using a stored algorithm. In particular, a basic system characteristic and a basic system characteristic can be determined. The oscillatory behavior and/or the oscillatory response of the structural component when new and/or the derived basic system characteristic and/or the basic system characteristic can be used as a reference pattern for monitoring the structural component. For the determination of the basic system characteristic and the basic system characteristic, characteristic values from measurement signals of one or more sensors, from frequency analysis and/or frequency observation of the at least one measurement signal, the energy content of the measurement signal, the comparison of measurement signal sections and/or other analysis methods and their combination can be used.

Advantageously, the evaluation device can be configured to perform a continuous comparison between a live oscillatory response with the basic system characteristic and/or the basic system characteristic during operation and to compare the comparison result with a tolerance limit. In particular, the evaluation device can be configured to assume an impermissible event and/or an impermissible operating state when a tolerance limit is exceeded and, if necessary, to trigger a test mode which preferably analyzes a cause for exceeding the tolerance limit to determine whether the cause lies in the ambient conditions and/or an overload and/or another system state.

If a cause is positively identified in the test mode, the exceeding of the tolerance limit can be related to it, while otherwise it can be assumed that it is a change in the structural component, in particular in the structural stiffness, and/or the system may no longer be operated and requires a detailed check.

The tolerance limit is advantageously determined continuously or cyclically again and again with the help of the self-learning system. Advantageously, a current machine condition variable such as wear, aging of components and the like, and/or previous tolerance limit exceedances can be included or taken into account in determining the tolerance limit. The newly determined tolerance limit is included in the verification loop so that the tolerance limits are adapted to the new plant condition.

In particular, the apparatus can use artificial intelligence to compare the continuously measured structure-borne sound response of the structural component or the entire work machine or a subassembly thereof with the characteristic structure-borne sound vibration behavior, the so-called acoustic footprint of the work machine, in order to identify damage on structural component(s), in particular crack formation.

By means of the AI system, the acoustic footprint of the work machine and/or the structural component(s) can be adapted depending in particular on the age of the work machine and/or the structural component, the machine condition and the changes in environmental influences. This allows the forecast to be kept accurate at all times and the error rate to be minimized.

In order to obtain a meaningful structure-borne sound image, it can be advantageous to assign at least one structure-borne sound sensor to a rolling bearing of the work machine in order to detect the structure-borne sound emitted by the rolling bearing. Advantageously, structure-borne sound sensors can be assigned to one or both races of the rolling bearing in order to detect the structure-borne sound directly at the race of the rolling bearing.

In order to better monitor the work machine as a whole for damage, several rolling bearings of the system, which can jointly support a rotary component or separately support several rotary components, can be assigned in order to detect the structure-borne noise of the several rolling bearings.

The evaluation device can compare the structure-borne sound emissions of the various rolling bearings with each other in order to compare changes in the structure-borne sound image at one rolling bearing with accompanying changes in the structure-borne sound image at one or more rolling bearings and thus detect abnormal changes in the structure-borne sound image more precisely. Such a comparison can be made in addition to the adaptation of the evaluation criteria and/or signal reference pattern.

In further development of the invention, the structural component can in particular be a large rolling bearing, for example a centerless large rolling bearing with a diameter of more than 0.5 m or more than 1.0 m, monitored with respect to structure-borne noise emissions.

Figure 2:
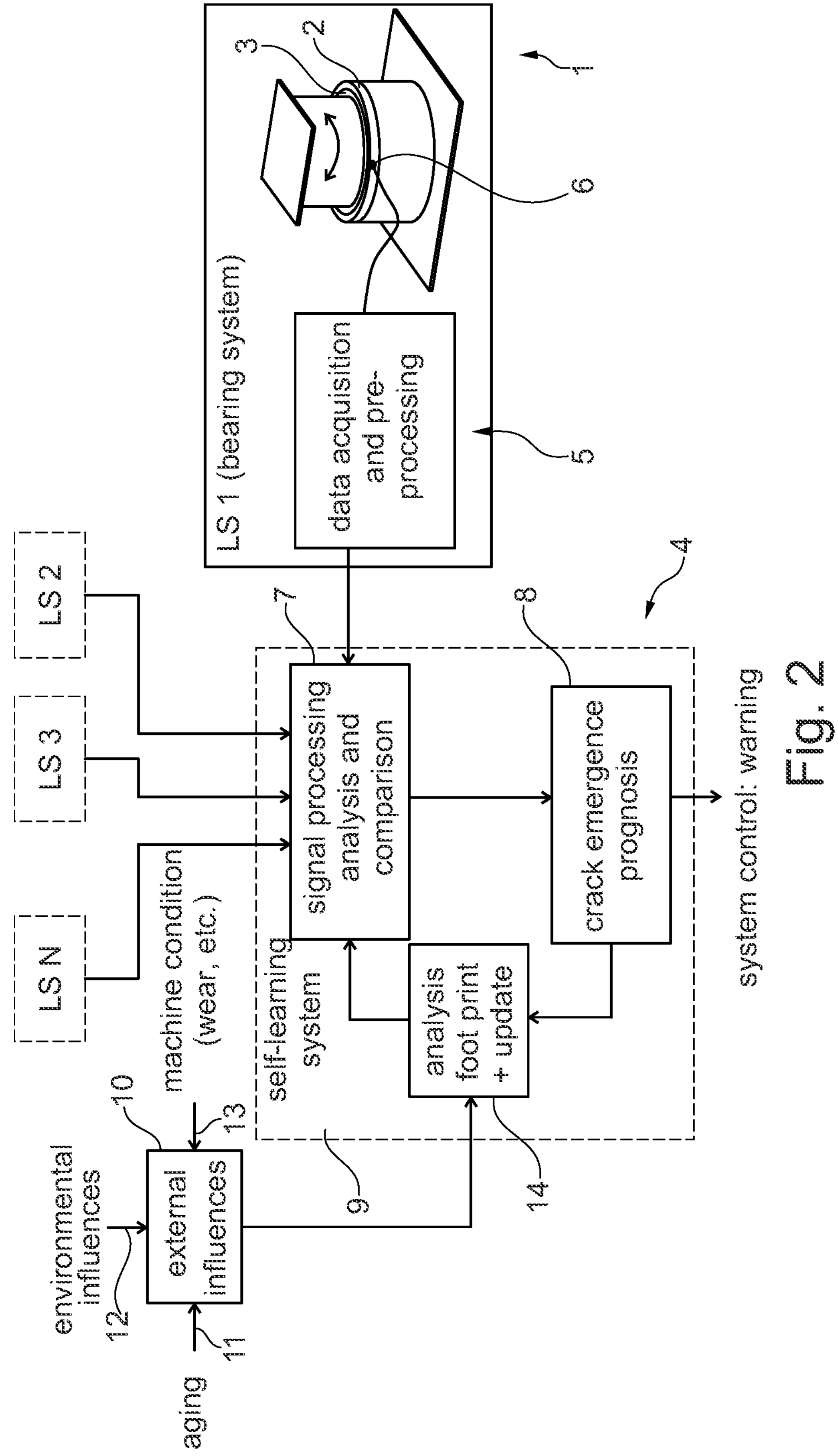
Figure 3:
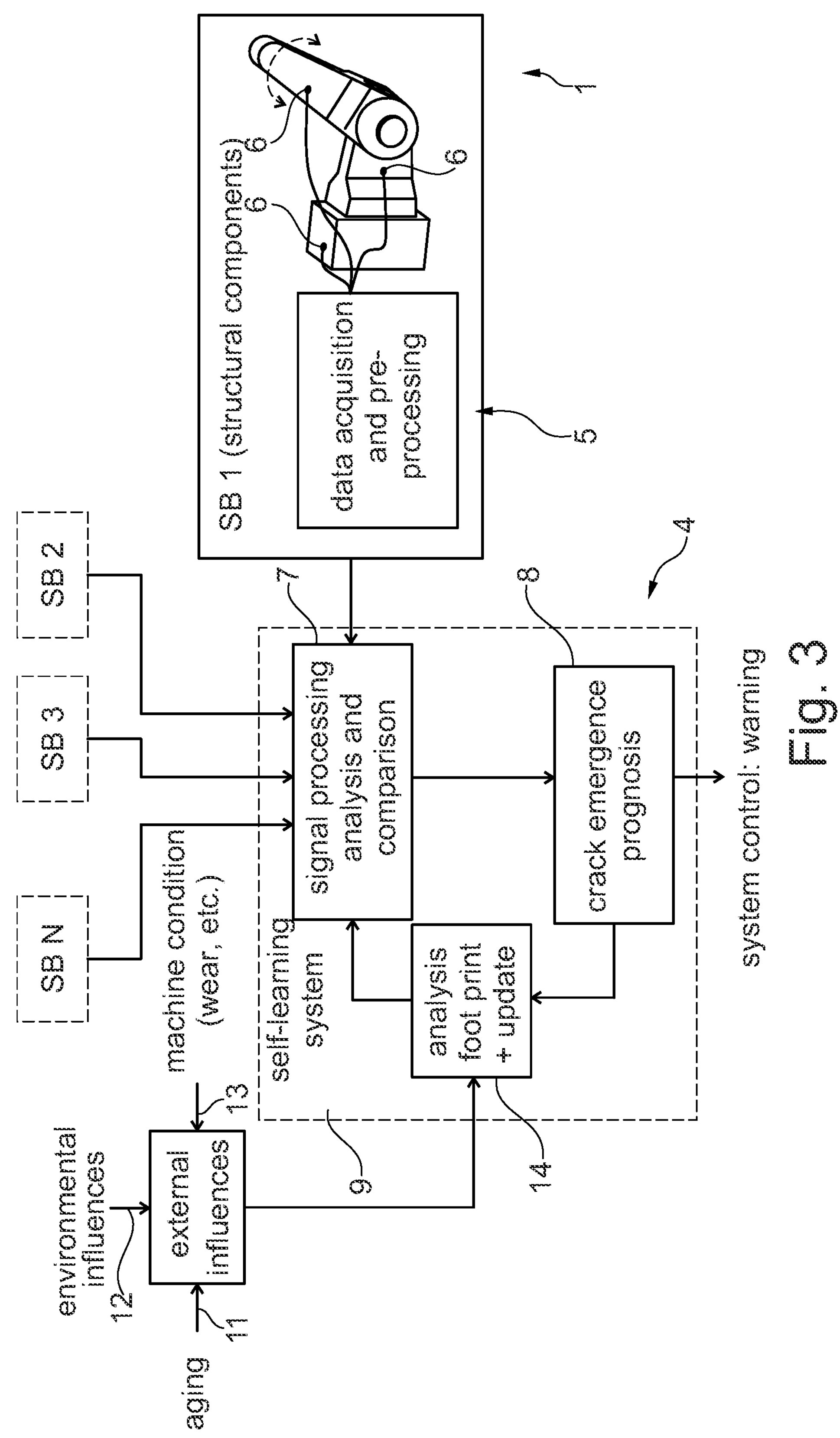
Figure 4:
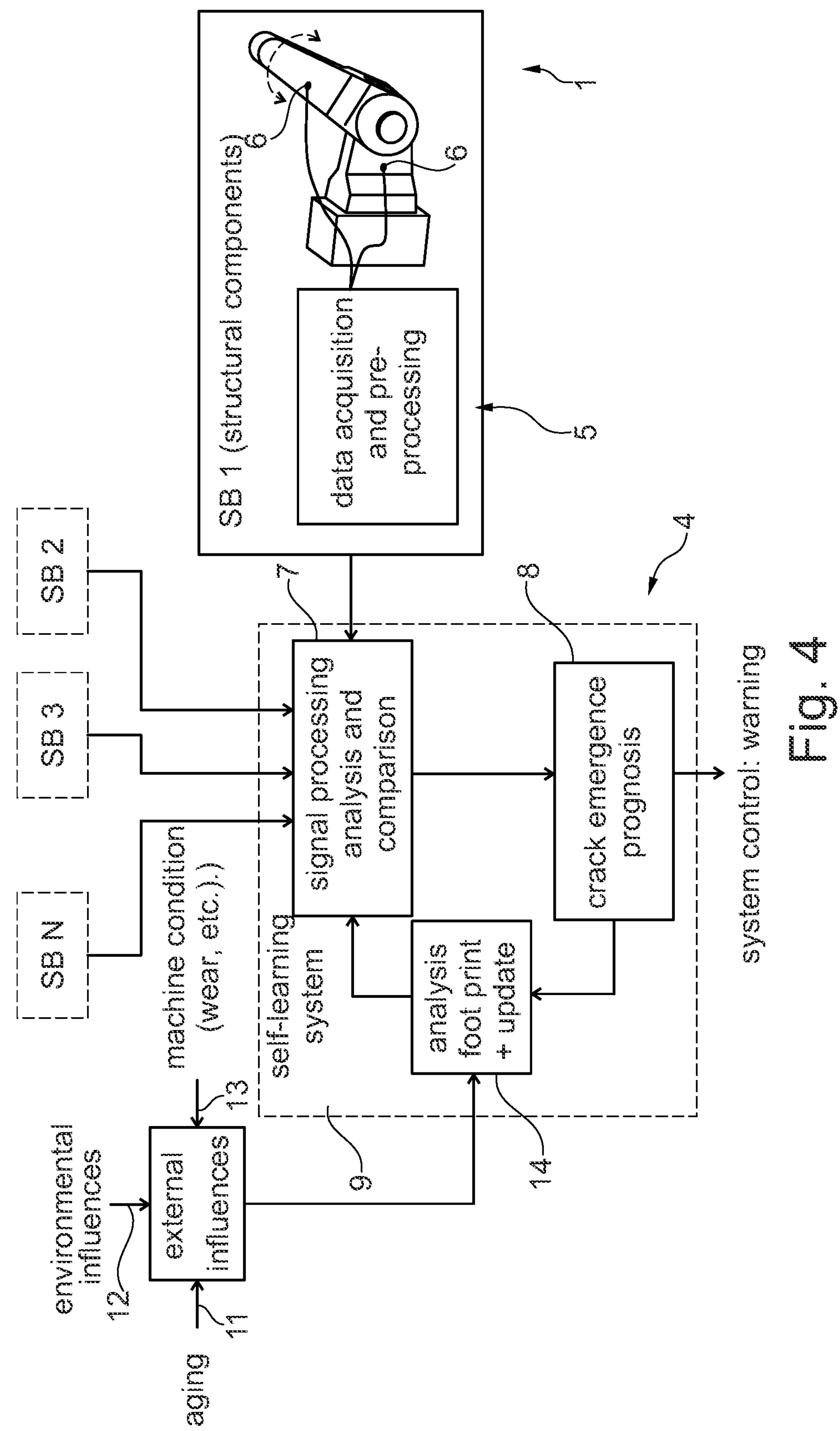
Figure 5:
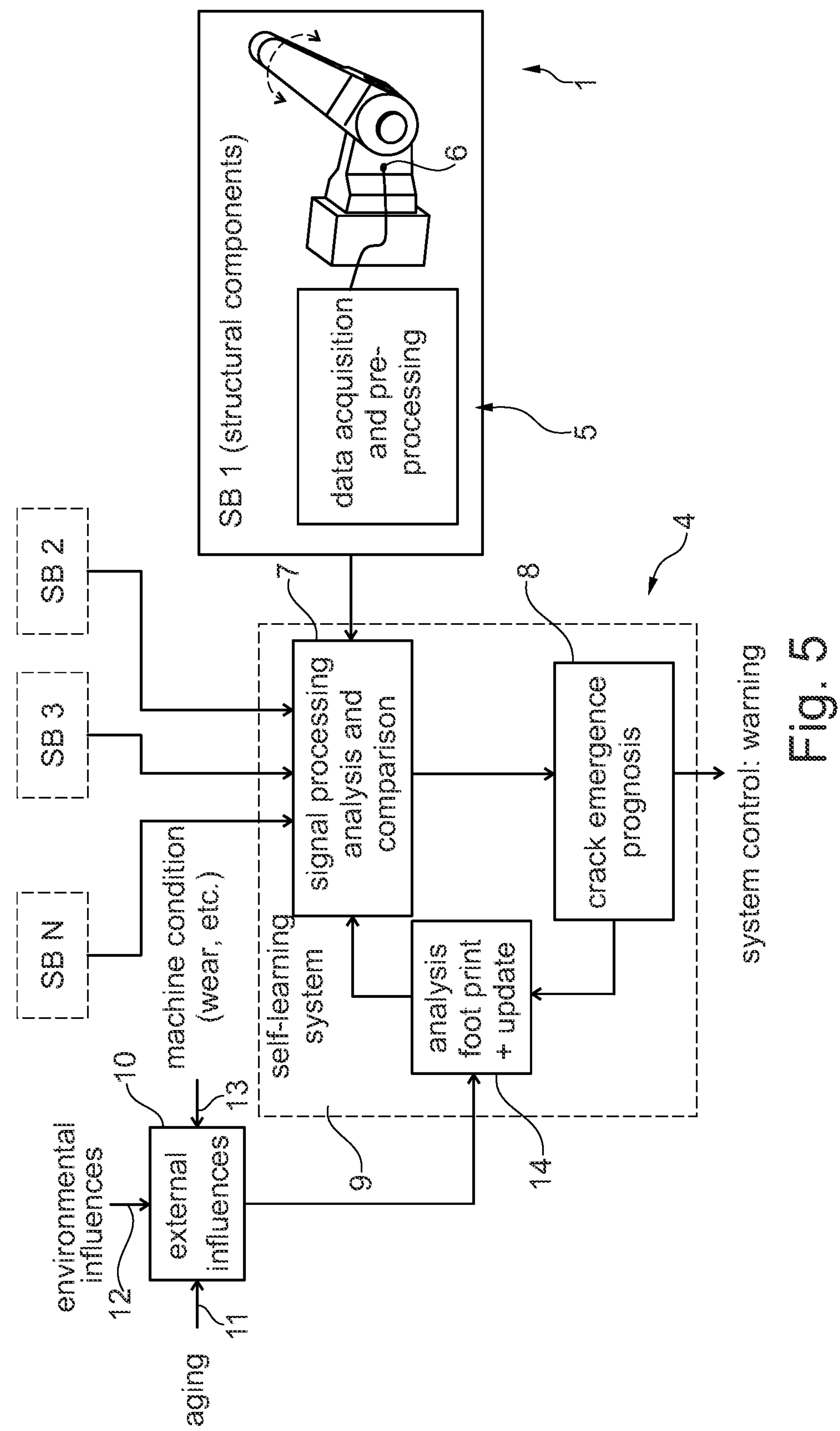
Figure 6:
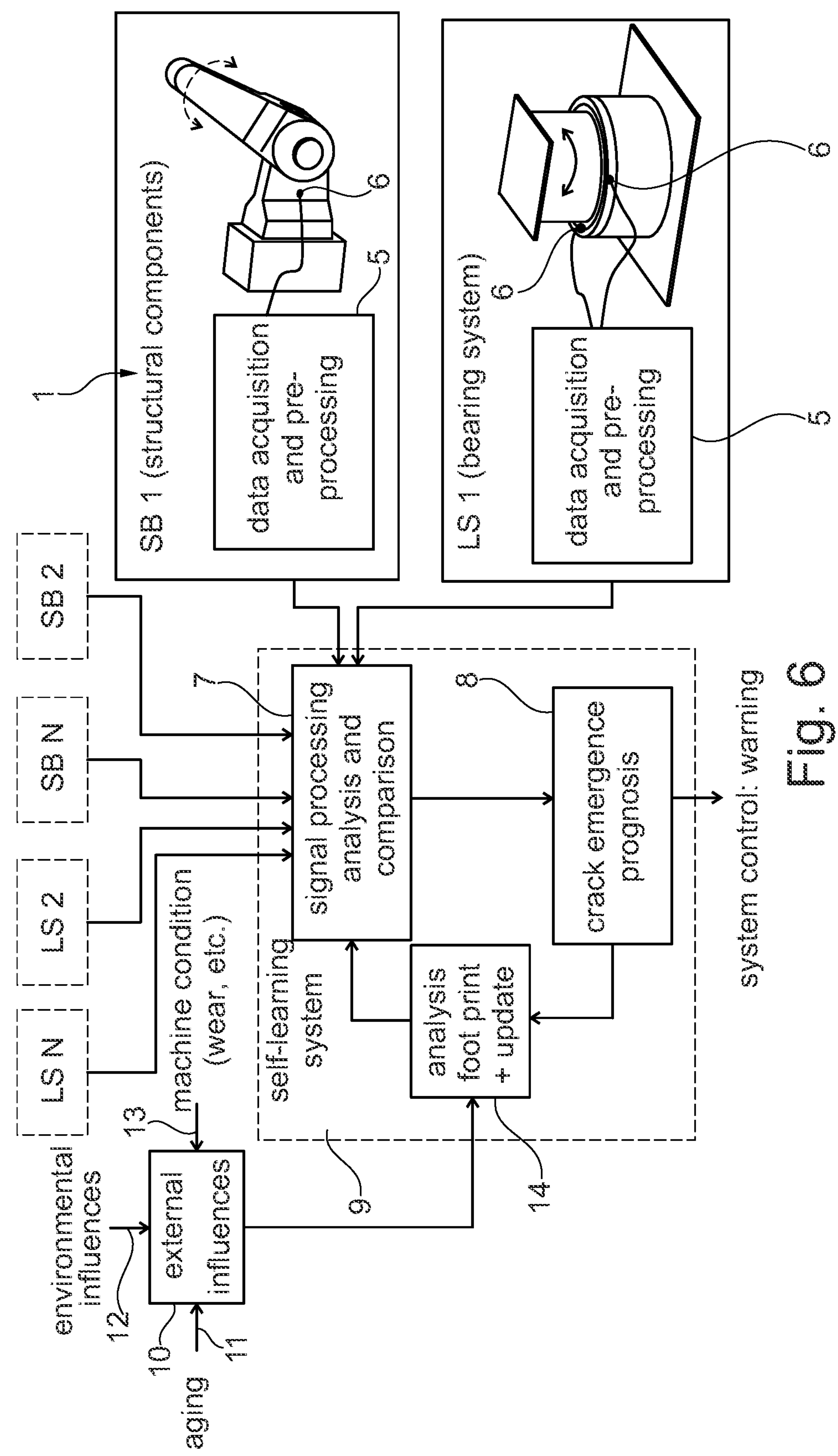
Figure 7:
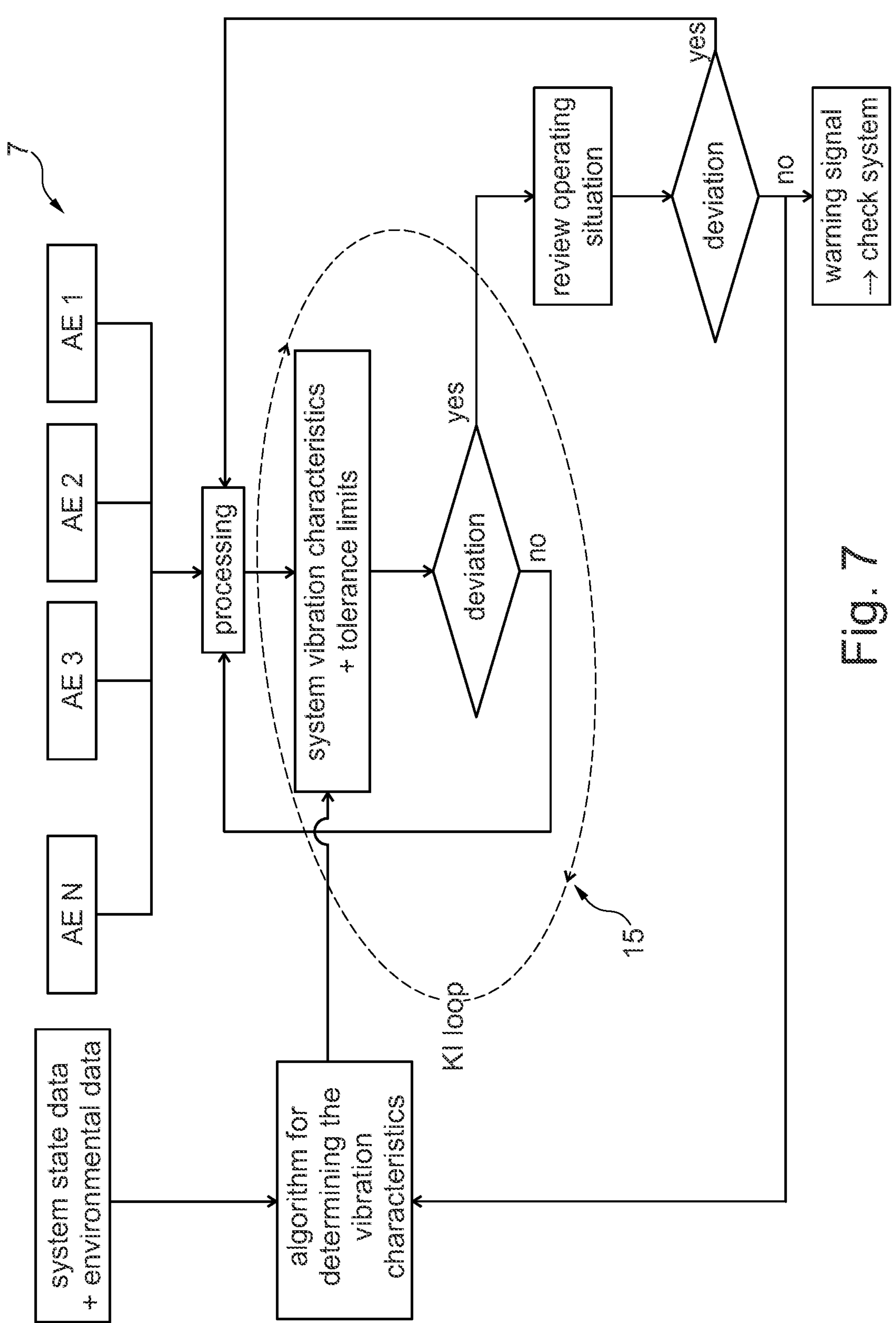
Figure 8:
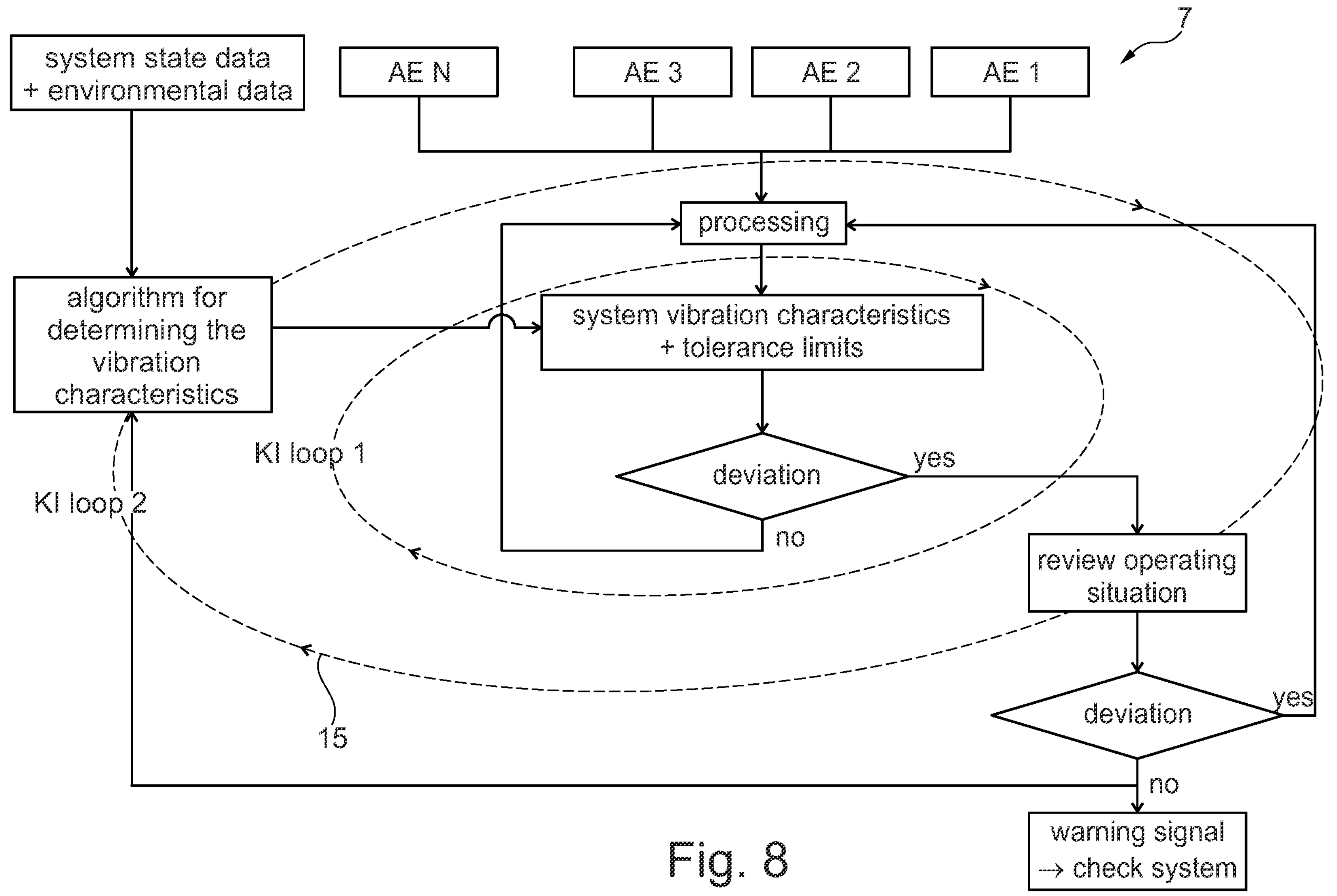
Figure 9:
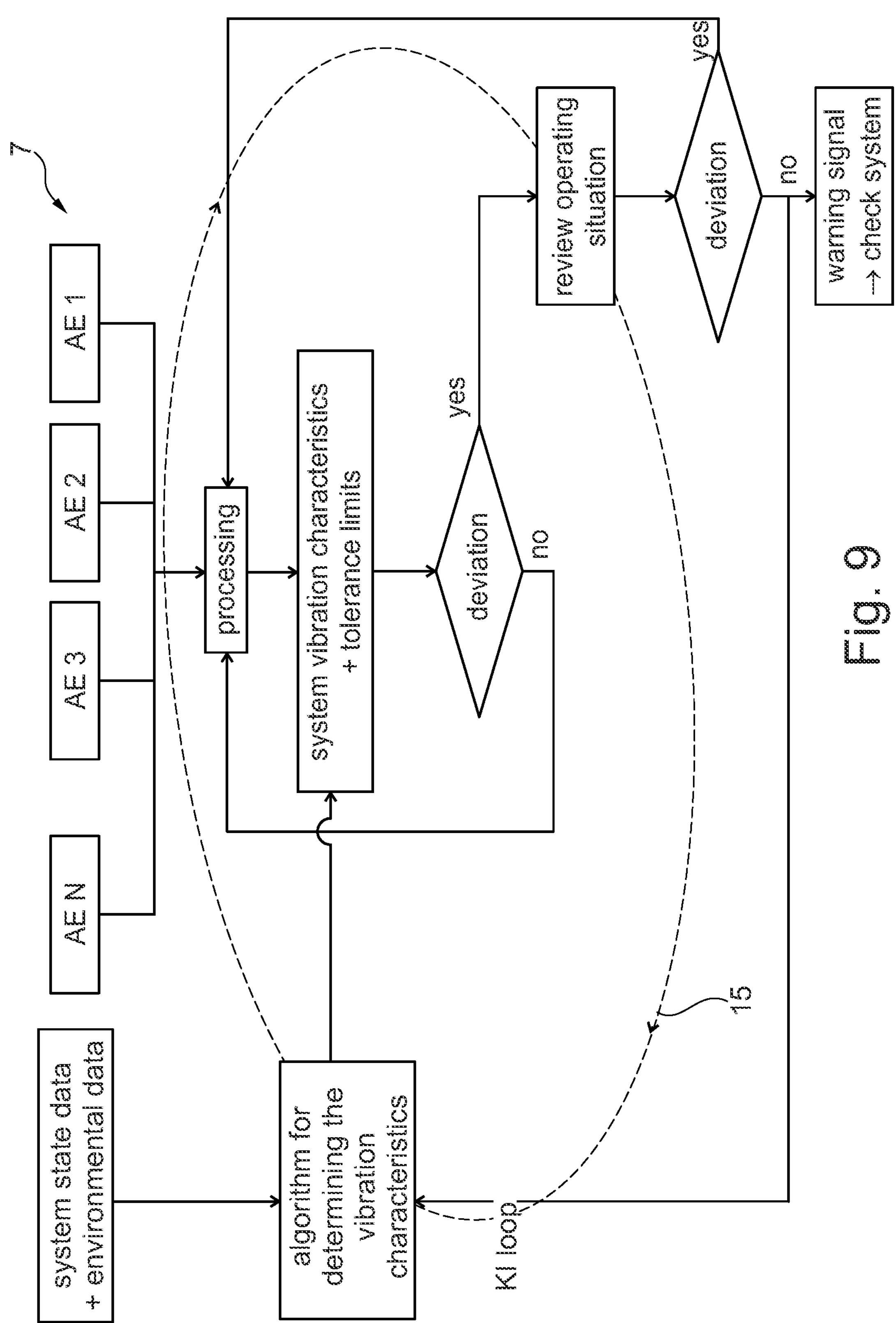

The invention is explained in more detail below on the basis of preferred embodiments and associated drawings. The drawings show:

FIG. 1: a schematic representation of an apparatus for determining damage on structural components of a work machine according to an advantageous embodiment of the invention, wherein the apparatus comprises a self-learning system for adapting the structure-borne sound signal evaluation and can determine damage such as in particular crack formation on a rolling bearing, FIG. 2: a schematic representation of an apparatus for determining damage on structural components of a work machine similar to FIG. 1, the apparatus using only one structure-borne sound sensor to detect the structure-borne sound on the outer ring of the rolling bearing in comparison with FIG. 1, FIG. 3: a schematic representation of an apparatus for determining damage on structural components of a work machine according to a further advantageous embodiment of the invention, the apparatus comprising a self-learning system for adapting the structure-borne sound signal evaluation and being able to determine damage such as in particular crack formation on a pivotable structural component such as, for example, a pivotable boom or lever, wherein structure-borne sound sensors are provided on the pivotable boom, on the pivot bearing support arm and on the bearing base, FIG. 4: a schematic representation of an apparatus for determining damage on structural components of a work machine similar to FIG. 3, wherein, in comparison to FIG. 3, structure-borne sound sensors 6 are provided on the pivotable boom and on the pivot bearing support, FIG. 5: a schematic representation of an apparatus for determining damage on structural components of a work machine similar to FIGS. 3 and 4, wherein structure-borne sound is detected only by means of a structure-borne sound sensor on the pivot bearing support, FIG. 6: a schematic representation of an apparatus for determining damage on structural components of a work machine according to a further advantageous embodiment of the invention, wherein structure-borne sound is detected by means of a structure-borne sound sensor on a structural component such as a pivot bearing support and structure-borne sound is detected by means of one or more structure-borne sound sensors on the bearing ring of a rolling bearing, FIG. 7: a schematic representation of the apparatus for determining damage on structural components according to an advantageous embodiment of the invention, showing the self-learning system for determining the oscillatory characteristic of the structural component and/or the work machine and for matching the live oscillatory behavior with the determined oscillatory characteristic, wherein an adaptation process for adapting the oscillatory characteristic and its tolerance limits by means of an AI-based module is shown, FIG. 8: a schematic representation of the apparatus for determining damage on structural components according to a further advantageous embodiment of the invention similar to FIG. 7, showing the self-learning system for determining the oscillatory characteristic of the structural component and/or the work machine and for matching the live oscillatory behavior with the determined oscillatory characteristic, wherein an adaptation process for adapting the oscillatory characteristic and its tolerance limits by means of an AI-based building block is shown, and FIG. 9: a schematic representation of the apparatus for determining damage on structural components according to a further advantageous embodiment of the invention similar to FIG. 7, showing the self-learning system for determining the oscillatory characteristic of the structural component and/or the work machine and for matching the live oscillatory behavior with the determined oscillatory characteristic, wherein an adaptation process for adapting the oscillatory characteristic and its tolerance limits by means of an AI-based building block is shown.

As FIG. 1 shows, the work machine 1 may have a plurality of bearing systems LS 1, LS 2, LS 3 . . . LS N that can rotationally support or form structural components of the work machine 1. The bearing systems LS may have rolling bearings with bearing rings 2, 3 which can be rotated relative to one another and may be configured, in particular, in the form of large rolling bearings, in particular centerless large rolling bearings with diameters of more than one meter, in order, for example, to support large structural components of construction machinery, material handling machinery or conveyor systems such as cranes. For example, the revolving stage of a crane or a cable excavator or the boom of a tower crane or the rotor or rotor blade of a wind turbine can be rotatably supported by such a large rolling bearing. In principle, however, the bearing systems LS can also include other rolling bearings or also sliding bearings and/or rotatably support other structural components of other work machines.

The LS bearing systems can be used in various applications such as construction machinery, cranes, excavators, wind turbines and ships and, when installed, ensure a defined system or machine rigidity, which leads to an individual structure-borne noise oscillatory behavior or so-called acoustic footprint of the work machine 1.

In order to identify changes in the bearing system LS or in the entire work machine 1, the oscillatory behavior during operation can be monitored by means of an apparatus 4. In particular, structure-borne noise can be detected and analyzed to determine damage on structural components LS or structural components mounted thereon, where such damage may include cracks, pitting, or breakouts on the structural components or rolling element bearings or bearing systems LS.

As shown in FIG. 1, a structure-borne sound sensor 5 can detect structure-borne sound emissions emanating from the work machine 1 or its structural components and provide corresponding structure-borne sound signals.

The structure-borne sound sensor system 5 can advantageously comprise structure-borne sound sensors 6 associated with the bearing systems LS, which can detect structure-borne sound generated at the bearing systems LS. Advantageously, a structure-borne sound sensor 6 can be assigned to each of the bearing rings 2, 3, cf. FIG. 1, to enable precise monitoring of structure-borne sound emissions at the bearing systems LS.

As shown in FIG. 2, however, it may also be sufficient to assign a structure-borne sound sensor 6 to only one of the bearing rings 3 in order to be able to determine a structure-borne sound pattern of the bearing system.

As shown in FIG. 3, however, not only a bearing system but also a structural component arrangement and its structural components SB 2, SB 3, . . . SB N can be monitored. For example, a plurality of structure-borne sound sensors 6 can be used to detect structure-borne sound patterns on a pivotable lever or a pivotable boom of a crane, for example, structure-borne sound patterns on a pivot bearing support, and structure-borne sound patterns on a mounting or bearing base of the pivotable structural component assembly. As shown in FIGS. 4 and 5, it may also be sufficient to detect the structure-borne sound only by means of a structure-borne sound sensor 6 on the pivotable structural component and on the pivot bearing support, cf. FIG. 4, or to detect the structure-borne sound only by means of a structure-borne sound sensor 6 on the pivot bearing support, cf. FIG. 5.

However, as shown in FIG. 6, the apparatus can also be configured to detect structure-borne sound at structural components SB, such as a pivotable boom or its pivot bearing support, and also to detect structure-borne sound at a bearing system LS, for example by means of structure-borne sound sensors at the bearing rings.

The structure-borne sound signals from the structure-borne sound sensor 5, which in addition to data acquisition can also perform data preprocessing, for example in the form of signal filtering and/or smoothing, are fed to an evaluation device 7, which can be provided directly on the work machine 1 or can also be provided separately at a distance therefrom, for example in the form of an evaluation server. The evaluation device 7 may comprise a data processing system having one or more microprocessors, a program memory, and software modules loaded therein to electronically evaluate the structure-borne sound signals.

In particular, the evaluation device 7 can evaluate the structure-borne sound signals of the structure-borne sound sensor 5 on the basis of predetermined, variable evaluation criteria and/or compare them with one or more structure-borne sound signal reference patterns in order to draw conclusions about the damage state of the structural component or of the work machine 1, in particular of the bearing system LS, on the basis of the deviation of the detected structure-borne sound signal pattern from the one or more reference patterns.

A prognosis device 8 can determine the damage state of the structural component on the basis of the evaluated structure-borne sound signals and/or provide a prognosis of progressive damage and, if necessary, provide a warning signal if critical damage is detected that requires component replacement.

The evaluation of the structure-borne sound signals from the structure-borne sound sensor 5 is not carried out on the basis of rigid rules that are unalterably defined in advance, but is continuously adapted and updated by means of a self-learning AI system 9, wherein on the one hand the continuously detected structure-borne sound signals are taken into account and on the other hand further condition and/or environmental parameters are used.

As shown in FIG. 1, a detection device 10 is provided that may have various detection means for detecting various state and/or environmental parameters. In particular, the detection device 10 may comprise aging detection means 11 for detecting aging and/or age and/or operating hours of the work machine 1 and/or the respective structural component, for example in the form of the bearing system LS.

Alternatively, or additionally, the detection device 10 may comprise an environmental sensor system 12 for detecting environmental influences such as temperature, dust, dirt and/or particle content of the ambient air, salt content of the ambient air, humidity, UV radiation load, ice and snow load or other relevant environmental parameters.

Alternatively or in addition to such an environmental sensor system 12, the detection device 10 may further comprise a state detection means 13 for detecting at least one machine and/or operating state parameter, wherein, for example, the set-up condition of the work machine 1, a wear condition of the work machine 1 and/or individual structural components such as the bearing systems LS, for example a bearing clearance of the bearing systems LS, a load condition of the work machine 1 and/or individual structural components, the load cycles on a structural component, a speed of movement of the work machine or a structural component thereof, or other condition parameters relevant to structure-borne sound can be detected and/or changes thereto can be determined.

The changes in environment and/or state detected by the detection device 10 are used by an adapting device 14 of the AI system 9 to continuously adapt the evaluation criteria of the evaluation device 7 and/or the structure-borne sound signal reference pattern used for signal comparison.

In particular, the AI system 9 can adapt the acoustic footprint of the work machine 1 or the bearing system LS depending on the age of the work machine 1 or the bearing system LS, the machine and/or operating condition, and changes in environmental influences. This allows the forecast to be kept accurate at all times and the error rate to be minimized.

Advantageously, the system can be configured to determine the oscillatory behavior and/or the oscillatory response of the structural component SB, LS in operation and/or to predetermined loads when the structural component SB or the bearing system LS is in a new state, wherein the system can comprise a new state determination module for this purpose, which can determine the oscillatory behavior and/or the oscillatory response of the structural component using a stored algorithm 16, cf. FIG. 7. In particular, a basic system characteristic and a basic system characteristic can be determined. For this purpose, characteristic values from measurement signals of one or more sensors 6, from frequency analysis and/or frequency observation of the at least one measurement signal, the energy content of the measurement signal, the comparison of measurement signal sections and/or other analysis methods and their combination can be used, cf. FIG. 7.

Advantageously, the evaluation device 7 can be configured to perform a continuous comparison during operation between a live oscillatory response with the basic system characteristic and/or the basic system characteristic and to compare the comparison result with a tolerance limit, cf. FIG. 7. In this respect, the evaluation unit 7 can run through one or more self-learning or AI loops by means of an AI module 15, cf. FIGS. 7 to 9

In particular, the evaluation device 7 can be configured to assume an impermissible event and/or an impermissible operating state when a tolerance limit is exceeded and, if necessary, to initiate a test mode which preferably analyzes a cause for exceeding the tolerance limit to determine whether the cause lies in the ambient conditions and/or an overload and/or another system state, cf. FIG. 8.

If a cause is positively identified in the test mode, the exceeding of the tolerance limit can be related to it, while otherwise it can be assumed that it is a change in the structural component, in particular in the structural stiffness, and/or the system may no longer be operated and requires a detailed check.

Advantageously, the tolerance limit is continuously or cyclically re-determined by the self-learning system, which may run through one or more optimization loops using the AI component 15. Advantageously, a current machine condition variable such as wear, aging of components and the like, and/or previous tolerance limit exceedances can be included or taken into account in determining the tolerance limit.

The newly determined tolerance limit is included in the verification loop so that the tolerance limits are adapted to the new plant condition.

The invention claimed is:

1. An apparatus comprising:

at least one structure-borne sound sensor configured to detect structure-borne sound signals of one or more structural components of a work machine;

a self-learning system comprising:

an evaluation device configured to:

evaluate one or more of the detected structure-borne sound signals; and determine a damage state of at least one of the structural components of the work machine on a basis of a comparison of the one or more of the evaluated structure-borne sound signals with one or more structure-borne sound signal reference patterns; and a detection device configured to detect one or more detected changes relevant to structure-borne sound; and an adapting device configured to adapt one or more adaptations on a basis of at least one of the detected changes;

wherein:

one or more of the detected changes is selected from a group consisting of a state change, an environmental change, and a combination thereof;

one or more of the adaptations is selected from a group consisting of at least one of the structure-borne sound signal reference patterns, an evaluation criterion, and a combination thereof; and the self-learning system is configured to estimate:

an influence of at least one of the detected changes on the structure-borne sound of the work machine; and a correlation between one or more changes in one or more of the structure-borne sound signals and actual damage to one or more of the structural components.

2. The apparatus according to claim 1, wherein the self-learning system further comprises;

a regression analysis module for determining at least one of:

the estimated influence; or the estimated correlation.

3. The apparatus according to claim 1, wherein the self-learning system further comprises:

an AI-based estimation module for estimating one or more correlations between at least one of:

one or more of the detected structure-borne sound signals and one or more of the detected changes; or one or more changes in one or more of the structure-borne sound signals and the actual damage to one or more of the structural components.

4. The apparatus according to claim 1, wherein:

the detection device comprises:

an aging detecting means configured to detect one or more of an age, an aging or operating hours of the work machine or one or more of the structural components; and the adapting device is further configured to adapt at least one of the adaptations on a basis of one or more of the detections of the aging detecting means.

5. The apparatus according to claim 1, wherein:

the detection device comprises an environmental sensor system for detecting one or more environmental influences acting on the work machine; and the adapting device is further configured to adapt at least one of the adaptations on a basis of one or more of the detected environmental influences.

6. The apparatus according to claim 5, wherein:

the environmental sensor system comprises at least one environmental sensor selected from a group consisting of a temperature sensor, air particle content sensor, salt content sensor, humidity sensor, UV dosimeter, snow and ice sensor, rain sensor, and a combination thereof; and the adapting device is further configured to adapt at least one of the adaptations on a basis of at least one signal of at least one of the environmental sensors.

7. The apparatus according to claim 1, wherein:

the detection device comprises at least one state detection means configured to detect one or more of a work machine state parameter or an operating state parameter; and the adapting device is further configured to adapt at least one of the adaptations on a basis of one or more of the detections of at least one of the state detection means.

8. The apparatus according to claim 7, wherein at least one of the state detection means is further configured to detect one or more of wear of one or more of the structural components, a bearing clearance, a load on one or more of the structural components or a setup condition of the work machine.

9. The apparatus according to claim 1, wherein the adapting device is further configured to adapt one or more of the adaptations based upon one or more changes in one or more of state parameters or environmental parameters.

10. The apparatus according to claim 1, wherein at least one of the structure-borne sound sensors is associated with a bearing system of the work machine and is configured to detect one or more structure-borne sounds emitted at the bearing system.

11. The apparatus according to claim 10, wherein:

the bearing system comprises two bearing rings rotatable relative to each other; and at least two of the structure-borne sound sensors is associated, one each, with each of the bearing rings.

12. The apparatus according to claim 1, wherein the evaluation device is further configured to determine the damage state on a basis of one or more deviations of the evaluated structure-borne sound signals in an amplitude or in a frequency band or in a frequency pattern from at least one of the structure-borne sound signal reference patterns.

13. The apparatus according to claim 1, wherein:

the evaluation device is further configured to compare at least one of a live oscillatory response detected by one or more of the structure-borne sound sensors or a characteristic value determined therefrom with a tolerance limit; and the self-learning system is further configured to adapt the tolerance limit continuously or cyclically on the basis of one or more current work machine condition variables and any previous tolerance limit exceedances.

14. The apparatus according to claim 1, wherein the evaluation device is further configured to determine cracks in one or more races of at least one rolling bearing of the work machine.

15. A work machine comprising:

the apparatus according to claim 1 configured to determine damage to one or more of the structural components of the work machine.

16. The work machine according to claim 15, wherein:

the work machine is selected from a group consisting of a construction machine, material handling machine and a conveying machine; and the evaluation device is configured to determine cracks in a large rolling bearing of the work machine.

17. An apparatus comprising:

at least one structure-borne sound sensor configured to detect structure-borne sound signals of one or more structural components of a work machine;

a self-learning system comprising:

a detection device configured to detect one or more detected changes relevant to structure-borne sound, one or more of the detected changes being selected from a group consisting of a state change, an environmental change, and a combination thereof;

an evaluation device configured to:

evaluate one or more of the detected structure-borne sound signals; and determine a damage state of at least one of the structural components of the work machine on a basis of a comparison of the one or more of the evaluated structure-borne sound signals with one or more structure-borne sound signal reference patterns; and at least one of:

a regression analysis module; or an AI-based estimation module;

the self-learning system configured to estimate at least one of:

with the regression analysis module, an influence of at least one of the detected changes on the structure-borne sound of the work machine with the regression analysis module;

with the regression analysis module or the AI-based estimation module, a correlation between one or more changes in one or more of the structure-borne sound signals and actual damage to one or more of the structural components; or with the AI-based estimation module, one or more of the detected structure-borne sound signals and one or more of the detected changes; and an adapting device configured to adapt one or more adaptations on a basis of at least one of the detected changes, one or more of the adaptations selected from a group consisting of one of the structure-borne sound signal reference patterns, an evaluation criterion, and a combination thereof.

18. The apparatus according to claim 17, wherein:

the evaluation device is further configured to determine the damage state on a basis of one or more deviations of the evaluated structure-borne sound signals in an amplitude or in a frequency band or in a frequency pattern from at least one of the structure-borne sound signal reference patterns;

the detection device comprises an aging detecting means configured to detect one or more of an age, an aging or operating hours of the work machine or one or more of the structural components; and the adapting device is further configured to adapt at least one of the adaptations on a basis of one or more of the detections of the aging detecting means.

19. The apparatus according to claim 17, wherein:

at least one of the structure-borne sound sensors is associated with a bearing system of the work machine and is configured to detect one or more structure-borne sounds emitted at the bearing system;

the bearing system comprises two bearing rings rotatable relative to each other; and at least two of the structure-borne sound sensors is associated, one each, with each of the bearing rings.

* * * * *